United States Patent [19]
Bahnsen

[11] 3,738,241
[45] June 12, 1973

[54] CAMERA WITH FILM SPACER

[76] Inventor: Gerhard I. W. Bahnsen, P.O. Box 1297, South Lake Tahoe, Calif. 75705

[22] Filed: May 18, 1970

[21] Appl. No.: 38,442

[52] U.S. Cl. .................. 95/24, 95/26, 95/37, 95/45
[51] Int. Cl. .......................................... G03b 19/10
[58] Field of Search .................. 95/23, 24, 26, 37, 95/45

[56] References Cited
UNITED STATES PATENTS

| 50,555 | 10/1865 | Burcaw | 95/45 |
|---|---|---|---|
| 3,369,470 | 2/1968 | Downey | 95/26 X |
| 2,584,311 | 2/1952 | Wells | 95/37 |
| 1,592,705 | 7/1926 | Piloty | 95/45 X |
| 257,206 | 5/1882 | Blair | 95/11 R |
| 357,752 | 2/1887 | Adams | 95/11 R |
| 1,724,566 | 8/1929 | Davidson | 95/11 R |
| 1,724,866 | 8/1929 | Allison | 95/11 R |

Primary Examiner—Samuel S. Matthews
Assistant Examiner—Michael Harris
Attorney—William P. Green

[57] ABSTRACT

A film pack type camera having a spacer which is removably insertible into the camera at a location to be received in front of the film, in a manner shifting the plane of the film slightly rearwardly relative to the camera lens, to thus correspondingly alter the subject-to-camera distance at which an image of the subject is in focus on the film, and thereby allow for easy and rapid, but precise, conversion of the camera between two different subject-to-camera distance conditions.

7 Claims, 7 Drawing Figures 3,738,241
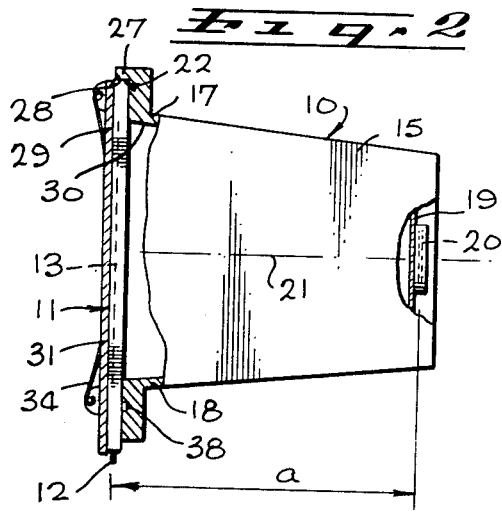
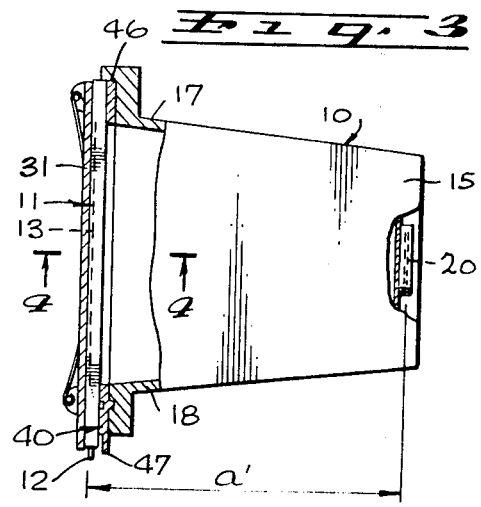
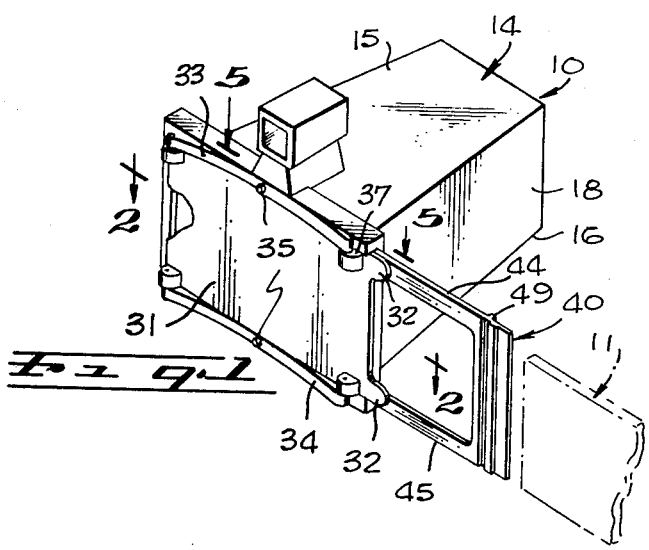
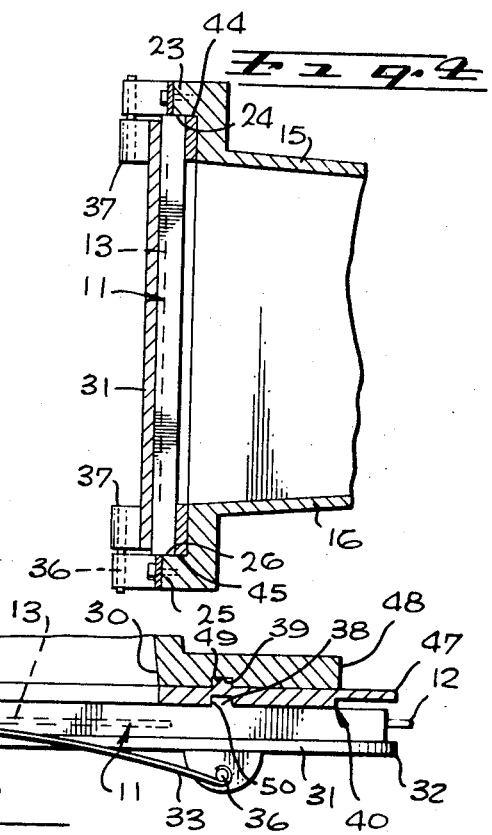
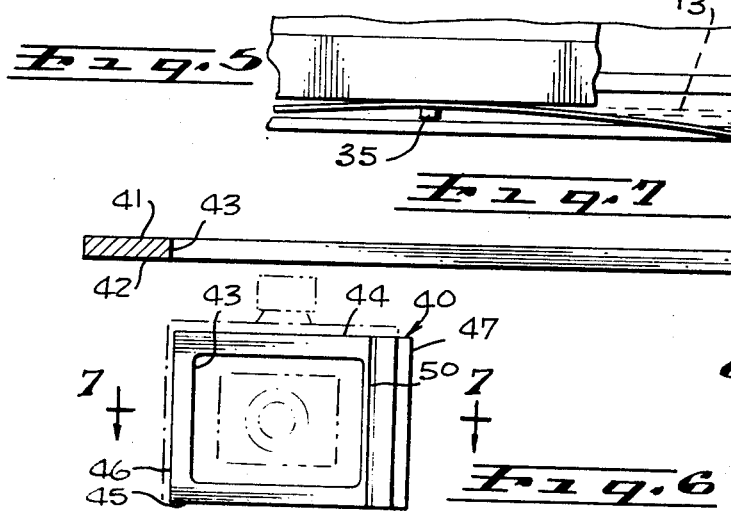
INVENTOR.
GERHARD I. W. BAHNSEN
BY
William P. Green
ATTORNEY

CAMERA WITH FILM SPACER

BACKGROUND OF THE INVENTION

This invention relates to improved means for changing the subject-to-camera distance for which a camera is set.

In a number of different occupations, hobby situations and other fields of endeavor, it is desirable to provide camera equipment which can be operated by persons with very limited photographic knowledge and skill, but which will under certain predetermined fairly standard photographic conditions produce pictures of very high and uniform quality. For example, it is desirable that law enforcement officers with relatively little photographic training be capable of taking photographs of evidenciary items, crime or accident scenes, or the like, in the field very rapidly and with reliability. To attain these purposes, cameras having fixed focus and other settings, or which may be adjusted to and utilized more or less permanently in certain predetermined settings, have been devised and employed, often in conjunction with holders which can support the camera in a predetermined manner or in a predetermined orientation with respect to the subject being photographed.

In many situations of the discussed type, it may be necessary to take pictures frequently at two different focus settings, in which the subject is to be located at two different distances from the camera. However, if an adjustment of the lens itself is relied on for conversion between these two focus settings, this introduces into the picture taking procedure more complexity than would be desired, may detract from the precision of focus which is attainable in a rigidly mounted non-adjustable fixed focus lens arrangement, and may introduce other disadvantages in use.

SUMMARY OF THE INVENTION

The present invention provides a unique device for very rapidly and effectively converting a camera between two different focus conditions without the necessity for adjustment of the lens itself, and in a manner positively assuring complete accuracy of focus in each of two or more different camera-to-subject focal conditions. This result is attained by employment of a spacer which is removably connectible to the camera at a location to shift the plane of the film rearwardly a short but accurately predetermined distance relative to the lens, to in this way correspondingly alter the subject-to-camera distance for which the lens is focused. The spacer is preferably utilized in conjunction with a film pack type camera, and is slidable into and out of the same guideway which receives the film pack itself during a picture taking operation. Thus, a person with very little photographic experience can take precisely focused pictures at two predetermined commonly used subject-to-camera distances, and can easily and rapidly convert between these two focus conditions by simply inserting or removing the spacer in the camera guideway. The spacer may have detenting means formed thereon which coact with the body of the camera to releasably retain the spacer in position in the camera, and which coact with the film pack to releasably retain it in its picture taking position.

BRIEF DESCRIPTION OF THE DRAWING

The above and other features and objects of the invention will be better understood from the following detailed description of the typical embodiment illustrated in the accompanying drawing in which:

FIG. 1 is a perspective view of a camera having a spacer embodying the invention;

FIG. 2 is a horizontal section taken on line 2—2 of FIG. 1, but showing a film pack in position in the camera, with the spacer removed;

FIG. 3 is a view similar to FIG. 2, and showing both the film pack and spacer in position in the camera;

FIG. 4 is an enlarged fragmentary vertical section taken on line 4—4 of FIG. 3;

FIG. 5 is a greatly enlarged fragmentary view taken partially on line 5—5 of FIG. 1, but with the upper portion of the camera body broken away in one location to reveal the horizontal sectional configuration of a portion of the body and the spacer;

FIG. 6 is a rear view of the spacer, with the camera body illustrated in broken lines; and, FIG. 7 is an enlarged horizontal section taken on line 7—7 of FIG. 6.

DESCRIPTION OF THE PREFERRED EMBODIMENT

With reference first to FIG. 1, I have shown at 10 an essentially fixed focus type of camera which is designed for use with a conventional rectangular film pack or slide 11, containing at least one film 13 adapted to be exposed after removal of a rectangular shield or plate 12 from the pack. If two films are present in the pack, they may be adapted for exposure from opposite sides of the pack, with two of the plates 12 being provided for the two films respectively.

The camera may include a rigid box-like body whose upper and lower walls 15 and 16, and opposite side walls 17 and 18, all may converge or taper forwardly as they advance toward the front wall 19 which carries the usual lens 20. As indicated previously, the lens 20 is of fixed focus, and produces on film 13 in the FIG. 2 normal position of the film pack 11 a focused image of a subject at a predetermined normal distance from the camera. This normal subject-to-camera distance is very precisely predetermined by the characteristics of the lens and the preset dimension a (FIG. 2) between the plane of the lens and the plane of film 13.

To mount the film pack 11 accurately in the normal FIG. 2 position at the back of the camera, and at right angles to the axis 21 of the lens, the back side of the camera body 14 is shaped to form a rectangular guideway 22 into which the film pack is slidable transversely of axis 21. This guideway is defined at its upper side by a horizontally extending rearwardly projecting flange 23 having a horizontal planar undersurface 24 for engaging the upper edge of film pack 11. The bottom of the guideway is defined by a similar horizontally extending and parallel rearwardly projecting second flange 25, having an upper planar horizontal surface 26 disposed parallel to surface 24 of flange 23, for engaging the bottom edge of the film pack. The vertical spacing between the two surfaces 24 and 26 corresponds very closely to the vertical height of film pack 11, to closely receive the pack and guide it for lateral sliding movement into and out of its picture taking position at the back of the camera.

A third side of the rectangular guideway 22 for receiving film pack 11 is defined by a third rearwardly projecting flange 27 (FIG. 2) which extends vertically at the left side of the camera as viewed in FIG. 1, and which has a vertical planar surface 28 engaging the inner edge 29 of the film pack to limit its sliding movement into the camera at the FIG. 2 position. The opposite vertical side of the guideway is left open (the right side as viewed in FIG. 1) to allow insertion and removal of the film pack.

The film pack 11 in its FIG. 2 picture taking position bears forwardly against a vertical planar rear surface 29 formed on the back of the camera body 14, which surface contains and defines a rectangular frame opening 30 through which light from lens 20 passes to film 13.

The back side of the film pack receiving guideway 22 is closed by a spring pressed rigid retaining plate 31, which is of essentially rectangular configuration except for the provision of two laterally projecting tabs 32 at the open side of the guideway recess. At its upper and lower sides and left side as viewed in FIG. 1, the film retaining plate 31 has edges which follow essentially along and are closely adjacent the three flanges 23, 25 and 27.

Plate 31 of course lies in a vertical plane, parallel to the vertical plane of surface 29 formed at the back side of the camera, and is yieldingly urged forwardly by two leaf springs 33 and 34 extending along the back side of the flanges 23 and 25. Each of these leaf springs is secured at its center by a screw or other fastener 35 to a central portion of the corresponding flange 23 or 25, and then extends laterally in both directions from that fastener to connect at its opposite ends to a pair of vertical parallel pins 36 which project into and are rigidly secured to corresponding enlargements or bosses 37 formed on and projecting rearwardly from plate 31. Thus, the plate 31 is urged forwardly at four different locations against film pack 11 to hold the film pack tightly against the back surface 29 of the camera body.

The film pack 11 has at its forward side a vertical forwardly projecting detent rib 38 (FIG. 2), which in the fully inserted FIG. 2 position of the film pack is receivable within a correspondingly shaped and dimensioned vertically extending rearwardly facing groove 39 formed in the back surface 29 of the camera body. Thus, when the film pack is received in its FIG. 2 position, the detenting engagement of rib 38 and recess 39 releasably retains the film against unwanted dislocation from the film guideway.

The present invention is particularly concerned with the provision, in conjunction with the above discussed camera structure, of a spacer 40, which can be inserted to the FIG. 3 position in the film receiving guideway 22, and which then causes the film 13 within pack 11 to be spaced an increased distance $a'$ from the plane of lens 20, as compared with the distance $a$ of FIG. 2, to thus change the focal characteristics of the camera and produce a precisely focused image on the film when the subject-to-camera distance is a predetermined value less than that for which the normal arrangement of FIG. 2 is designed.

Spacer 40 is essentially a flat planar element, disposed in a vertical plane perpendicular to axis 21 of the lens and film. More particularly, the spacer (which of course is formed of an opaque material) has a forward planar surface 41 and a rear planar surface 42 disposed parallel to surface 41, and contains a rectangular opening 43 (FIGS. 1 and 6) which is shaped the same as rectangular opening 30 formed by the back wall of the camera, and which in the fully inserted FIG. 3 position of the spacer is exactly opposite and forms in effect a continuation of camera opening 30. The upper and lower edges 44 and 45 of the spacer are parallel to one another and extend horizontally in the FIG. 1 position of the camera, and are spaced apart a distance corresponding to surfaces 24 and 26 of flanges 23 and 25 (FIG. 4) to guide the spacer 40 for sliding movement into and out of the film receiving guideway 22. At its left side, as viewed in FIG. 6, the spacer 40 has a vertical edge 46 which is perpendicular to edges 44 and 45 and is received closely adjacent and extends along and parallel to surface 28 of body flange 27 in the FIG. 3 fully inserted position of the spacer. At its right side, the spacer has a tab portion 47, which may be of reduced thickness as seen in FIG. 5 to space the tab away from the film slide and avoid interference therewith, and which projects laterally beyond the right edge 48 of the camera body to allow grasping of tab 47 of the spacer in order to remove it from the camera body when desired.

Near its right side, the spacer 40 may have on its front face a vertical rib 49 which continues through the entire vertical height of the spacer and is dimensioned and positioned to be received within the previousy mentioned groove 39 formed in the rear face of the camera body when the spacer is in its FIGS. 3 and 5 fully installed position. Similarly, the back face or surface 42 of the spacer 40 contains a vertical recess located directly behind rib 49 and extending through the entire vertical height of the spacer, and positioned and dimensioned to receive the previously mentioned forwardly projecting vertical rib 38 formed on the film pack 11 when both the spacer and film pack are in their fully installed positions of FIGS. 3 and 5.

To now describe the manner of use of the camera, assume first of all that it is desired to take a series of pictures at a predetermined first subject-to-camera distance for which the camera is designed without use of spacer 40. To take such pictures, an operator merely inserts the film pack 11 laterally into the guideway formed in the back of the camera into the FIG. 2 position, then removes one of the protective shields 11 from the pack, and actuates the shutter associated with lens 20 to expose the film. A subject at the predetermined proper distance from the camera will then be imaged accurately in focus on the film to produce a focused picture of high quality. If it is desired to take one or more pictures at the shorter predetermined subject-to-camera distance for which spacer 40 is designed, the user inserts spacer 40 laterally into the guideway in the back of the camera, as represented in FIG. 1, and then inserts a film pack into the guideway behind the spacer and in front of retaining plate 31. The parts are then received in the position of FIG. 3, in which the film is held at a changed distance $a'$ from the lens, to thus produce a precisely focused image on the film at a changed and accurately predeterminable subject-to-camera distance. The camera is thus easily convertible between its two different focus conditions, without changing the position or condition of lens 20 in any way. Also, the detenting engagement of rib 49 with the camera body enables the spacer 40 to be releasably retained in the camera body while a series of film packs are inserted and removed successively. Each film pack thus inserted is itself detented in proper position within the guideway by engagement of its rib 38 with the recess 50 formed in the back side of the spacer. As will be apparent, the leaf springs 33 and 34 which urge film retaining plate 31 forwardly are designed to have a sufficiently wide range of movement in a front to rear direction to enable the rear plate to exert forward force against the film only in the FIG. 2 position, and against both the film and spacer in the FIG. 3 position, to thus hold the film in position in either of these two conditions.

If the film pack 11 is of a reversible type, in which a second film is positioned for use by removing the pack from the camera and then reinserting it with its second side facing forwardly, that second side of the pack may have a second projection similar to projection 38 for reception in detenting relation within groove 39 or 50 of the camera body or spacer.

While a certain specific embodiment of the present invention has been disclosed as typical, the invention is of course not limited to this particular form, but rather is applicable broadly to all such variations as fall within the scope of the appended claims.

I claim:

1. An assembly comprising a camera body; a lens mounted to said body; film retaining means at the rear of said body defining a generally transverse guideway, a film holder and carried film insertible into said guideway to a position for focusing an image through said lens on the film; and a focal adapter spacer removably slidable into said guideway in front of said film holder and operable when present to shift the plane of said film a predetermined distance rearwardly relative to said lens in a relation changing the subject-to-camera distance at which the image is in focus on the film; said film retaining means including means forming a rearwardly facing locating shoulder on the body against which said spacer is engageable forwardly, an essentially rectangular plate defining the back side of said guideway mounted movably to said body and yieldingly urged forwardly relative thereto in a relation urging both the film holder and spacer forwardly relative to said body and relative to said locating shoulder to positions limited by the shoulder, and leaf springs at the upper and lower edges of said plate connected to the plate and the camera body and yieldingly urging the plate forwardly relative to the camera body, said camera body having an essentially rectangular opening at its back side through which light passes from said lens to the film, said rearwardly facing locating shoulder being formed on the body about said opening and extending essentially rectangularly thereabout, there being a vertical recess formed in said body at a side of said rectangular opening, said focal adapter spacer being essentially planar and externally substantially rectangular and containing a substantially rectangular opening registering with said opening in the body to pass said light from the lens to the film, and having a forwardly facing surface extending rectangularly about said opening in the spacer and engageable with said locating shoulder on the body entirely about the openings, said spacer having a vertical rib receivable within said groove in the body to releasably retain the spacer in position within said guideway, said film holder being a flat film pack located behind said spacer and between the spacer and said plate and having a front surface engageable with said spacer in light sealed relation rectangularly about said opening in the spacer, said film pack having a vertical rib receivable within a vertical groove formed in the back of said spacer at a side of the opening in the spacer to releasably retain the film holder and spacer in predetermined relative positions, said film holder and spacer both having portions projecting laterally from the guideway when the holder and spacer are fully inserted therein and enabling manual grasping of the holder and spacer for insertion into and removal from the guideway.

2. An assembly comprising a camera body having an opening at its back side; a lens mounted to said body; film retaining means at the rear of said body defining a generally transverse guideway into which a film holder and carried film are insertible to a position for focusing an image through said lens and through said opening onto the film; and a generally planar focal adapter spacer removably slidable generally transversely of the axis of said lens into and out of an active position in said guideway in front of said film holder and containing an opening receivable opposite said opening in the body and through which light passes from said lens to the film; said focal adapter spacer being constructed and dimensioned to shift the plane of said film a predetermined distance rearwardly relative to said lens in a relation effecting a predetermined change in the subject-to-camera distance at which the image is in focus on the film; said film retaining means including means forming a rearwardly facing locating shoulder on the body against which said spacer is engageable forwardly, a backing structure mounted movably to said body defining the back of said guideway and engageable forwardly against said film holder, and spring means yieldingly urging said backing structure forwardly relative to said body and relative to said locating shoulder through a range of movement sufficient to urge said film holder against said shoulder when the spacer is not present, and to urge both the film holder and spacer forwardly to positions limited by engagement of the spacer with said shoulder when the spacer is present; said spacer having a portion which projects laterally from said guideway, when the spacer is received in the guideway, and is accessible for maual grasping of the spacer to inset it into and remove it from the guideway.

3. An assembly as recited in claim 2, in which said backing structure is a generally rectangular film retaining plate defining a back side of said guideway, said spring means including springs connecting said plate to said camera body near peripheral edges of said plate and urging the plate forwardly.

4. An assembly as recited in claim 2, including detent means on said focal adapter spacer and said camera body for releasably retaining said spacer against removal from the body.

5. An assembly as recited in claim 2, including lug and recess detent means on said back side of said body and said spacer interfitting in a relation releasably retaining said spacer against sliding removal from an active position behind said body.

6. An assembly as recited in claim 2, in which said spacer has at its back side detenting means adapted to interfit with coacting means on said film holder in a relationship releasably retaining the film holder and spacer against relative lateral sliding movement.

7. An assembly as recited in claim 2, including lug and recess detent means on said back side of said body and said spacer interfitting in a relation releasably retaining said spacer against sliding removal from an active position behind said body, said spacer having at its back side additional detent means similar to a portion of said lug and recess means for releasably holding the film holder and spacer against relative lateral sliding movement.

* * * * *